(12) United States Patent
Wann

(10) Patent No.: US 11,857,905 B2
(45) Date of Patent: Jan. 2, 2024

(54) CARTRIDGES FOR VERTICALLY ORIENTED DUST COLLECTORS

(71) Applicant: Imperial Systems, Inc., Mercer, PA (US)

(72) Inventor: Jeremiah Wann, Mercer, PA (US)

(73) Assignee: Imperial Systems, Inc., Mercer, PA (US)

(*) Notice: Subject to any disclaimer, the term of this patent is extended or adjusted under 35 U.S.C. 154(b) by 272 days.

(21) Appl. No.: 16/438,270

(22) Filed: Jun. 11, 2019

(65) Prior Publication Data
US 2019/0374892 A1 Dec. 12, 2019

Related U.S. Application Data

(60) Provisional application No. 62/683,241, filed on Jun. 11, 2018.

(51) Int. Cl.
*B01D 46/00* (2022.01)
*B01D 46/52* (2006.01)
*B01D 46/42* (2006.01)

(52) U.S. Cl.
CPC ..... *B01D 46/0008* (2013.01); *B01D 46/4209* (2013.01); *B01D 46/4227* (2013.01); *B01D 46/521* (2013.01); *B01D 2267/60* (2013.01); *B01D 2271/027* (2013.01)

(58) Field of Classification Search
CPC ............ B01D 46/0008; B01D 46/4209; B01D 46/4227; B01D 46/521; B01D 2267/60; B01D 2271/027; B01D 25/002; B01D 25/12; B01D 25/127; B01D 25/21; B01D 25/215
USPC .......................................................... 55/360
See application file for complete search history.

(56) References Cited

U.S. PATENT DOCUMENTS

| | | | |
|---|---|---|---|
| 5,803,939 A * | 9/1998 | Huning | B01D 46/008 55/369 |
| 6,358,292 B1 * | 3/2002 | Clements | B01D 46/521 55/501 |
| 8,580,004 B1 * | 11/2013 | Clements | B01D 46/0005 55/378 |
| 9,616,371 B1 * | 4/2017 | Clements | B01D 46/71 |
| 2002/0020160 A1 * | 2/2002 | Moore | B01D 46/2411 55/502 |

(Continued)

FOREIGN PATENT DOCUMENTS

JP 2009045571 A * 3/2009

*Primary Examiner* — Robert A Hopkins
*Assistant Examiner* — Qianping He
(74) *Attorney, Agent, or Firm* — Jonathan M. D'Silva; MMI Intellectual Property

(57) ABSTRACT

A vertically oriented dust collector configured to filter dry particulate matter from an air stream comprises a housing containing at least one cartridge. Each cartridge comprises a filter pan having an opening with a filter incorporated into the opening. The filter pan has at least one alignment opening. The housing further comprises at least one pair of rails oriented parallel to each other within the housing onto which each cartridge is mounted and at least one alignment block sized and shaped to correspond to the alignment opening of the filter pan. The alignment block is positioned such that when the cartridge is installed in the housing, the alignment opening of the filter pan aligns with the alignment block.

10 Claims, 5 Drawing Sheets

(56) References Cited

U.S. PATENT DOCUMENTS

| | | | | |
|---|---|---|---|---|
| 2004/0250518 | A1* | 12/2004 | Kao | B01D 46/08 |
| | | | | 55/379 |
| 2009/0249754 | A1* | 10/2009 | Amirkhanian | B01D 46/008 |
| | | | | 55/357 |
| 2012/0198801 | A1* | 8/2012 | Weber | B01D 46/0068 |
| | | | | 55/302 |
| 2019/0255476 | A1* | 8/2019 | Silvestro | B01D 46/2414 |

* cited by examiner

CARTRIDGES FOR VERTICALLY ORIENTED DUST COLLECTORS

BACKGROUND

Manufacturing and industrial systems have robust systems for the processing of air, to remove dust, improve air quality, increase worker safety, etc. These systems typically include filter systems that collect airborne particles from the air stream. The arrangement and configuration of these filters within the system are an important and essential step in the air handling and treatment.

SUMMARY

What is presented is a vertically oriented dust collector configured to filter dry particulate matter from an air stream comprising a housing containing at least one cartridge. Each cartridge comprises a filter pan having an opening, a filter incorporated into the opening, and at least one alignment opening incorporated into the filter pan. The housing further comprises at least one pair of rails oriented parallel to each other within the housing onto which each cartridge is mounted. The housing also has at least one alignment block sized and shaped to correspond to the alignment opening of the filter pan. The alignment block is positioned such that when the cartridge is installed in the housing, the alignment opening of the filter pan aligns with the alignment block.

In some embodiments of the vertically oriented dust collector the opening is elliptical, and the filter has an elliptical cross-section. In other embodiments the opening is circular, and the filter has a circular cross-section. The alignment block may be configured such that improper installation of the cartridges into the housing prevents the operation of the vertically oriented dust collector.

In some embodiments of the vertically oriented dust collector the housing contains four said cartridges. In some embodiments, the housing contains two pairs of said rails. In some embodiments, the housing contains two alignment blocks for each pair of rails.

In some embodiments, the filter pan has mitered corners. In some embodiments the filter pan is a double walled pan that comprises a top pan and a bottom pan. In some embodiments each cartridge further comprises a grounding clip.

Those skilled in the art will realize that this invention is capable of embodiments that are different from those shown and that details of the apparatus and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Figure 1:
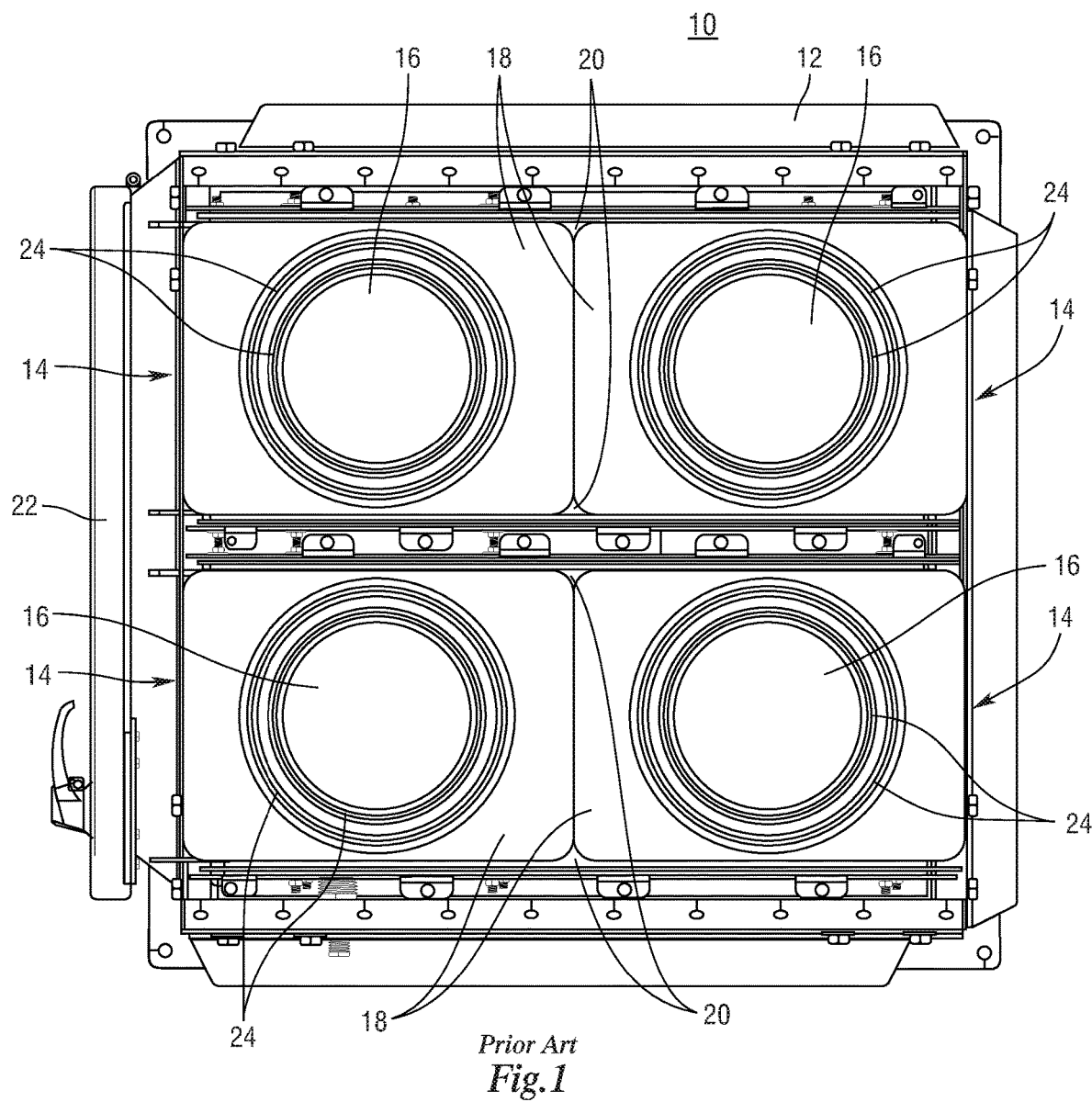
FIG. 1 is a top view of a prior art dust collector system.

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

Figure 2:
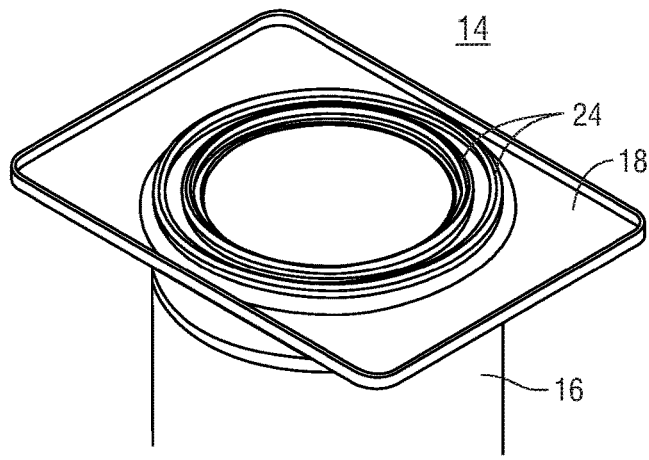
FIG. 2 is a perspective view of the upper portion of a prior art cartridge.

Dust collectors are used to filter dust, fumes, and other airborne particles from air handling systems typically for industrial applications. FIGS. 1 and 2 show examples of prior art dust collectors 10. As best understood by comparing FIGS. 1 and 2, the dust collectors 10 comprise a housing 12 that is connected to the air flow path of an air handling system. The housing 12 contains at least one cartridge 14 that comprises a filter 16 mounted to a filter pan 18 that seats the filter 16 within the housing 12. The embodiment of dust collector 10 shown in FIG. 1 comprises four cartridges 14 within the housing 12 that are mounted on two pairs of rails 20 (also referred to as lift rails or cam bars) that raise and position the cartridges 14 within the housing 12. In this embodiment two pairs of rails 20 mount two cartridges 14 each. A door 22 provides access to the cartridges 14 to permit a user to lower the rails 20 and change out the cartridges 14 as needed.

The filter 16 is typically made of a pleated media folded into a shape that the air passes through. The cartridges 14 have gaskets 24 to create air-tight seals to ensure that the air flows through the filters 16. The cartridges 14 may be horizontally or vertically oriented and each type has different structural requirements for installation of the cartridges 14 into the housing 12. The disclosure herein is related specifically to dust collectors having vertically oriented cartridges.

In prior art dust collector systems like the ones shown in the figures, there is generally no way to be certain that the cartridges 14 are properly seated within the housing 12 and that the gaskets 24 are properly placed to ensure all dust and fumes go through the filter 16 and not past the gasket 24. Most vertically oriented cartridges 14 use a filter pan 18 that has a raw upward facing edge facing (as best seen in FIG. 2) that creates a place for dust and debris to rest and weakens the overall strength of the filter pan 18. Another issue with prior art vertical cartridges: all current manufactures use a round or panel filter with a pan style top. This does not allow them to fully utilize the surface area of the pan.

The dust collector systems presented herein address many of the limitations of the prior art systems. The disclosure herein is related specifically to dust collectors having vertically oriented cartridges. As best understood by comparing FIGS. 3, 4, 5, and 6, the dust collectors 10a comprise a housing 12a that is connected to the air flow path of an air handling system. The housing 12a contains at least one cartridge 14a that comprises a filter 16a mounted to a filter pan 18a that seats the filter 16a within the housing 12a. The embodiment of dust collector 10a shown in FIG. 3 comprises four cartridges 14a within the housing 12a that are mounted on two pairs of rails 20a that raise and position the cartridges 14a within the housing 12a. In other embodiments, the number of rails 20a and the number of cartridges 14a may be varied according to the application. A door 22a provides access to the cartridges 14a to permit a user to lower the rails 20a and change out the cartridges 14a as needed.

Figure 4:
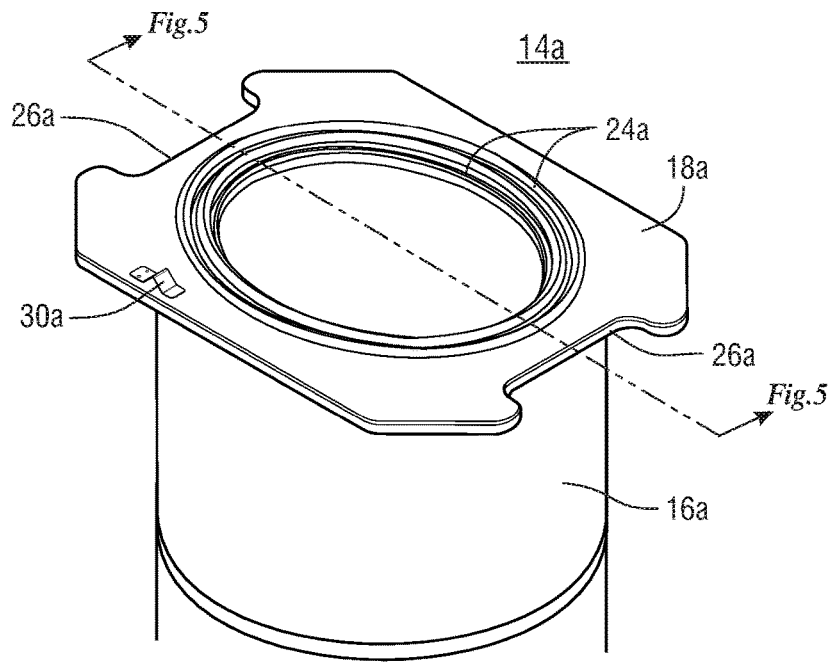
FIG. 4 is a perspective view of the upper portion of a cartridge from FIG. 3.

As best seen in FIG. 4, the filter 16a is made of a pleated media folded into a shape that the air passes through. The cartridges 14a have gaskets 24a to create air-tight seals to ensure that the air flows through the filters 16a. The filter pan 18a has a generally rectangular shape that has two sides that are longer than the other two. This means that the cartridge 14a generally only has two orientations in which it can fit into the housing 12a. While prior art cartridges 14 (shown in FIGS. 1 and 2) have circular filter openings that can only receive filters 16 that have a circular cross-section, the preferred embodiment has an opening that is elliptical in shape and can therefore receive a filter 16a that has an elliptical cross-section. Elliptical filters 16a allow more of the surface area of the filter pan 18a to be used which allows the filters 16a to be larger and have more surface area for airflow treatment. This allows the use of smaller filter housings with higher air volume throughputs. Other configurations and filter geometries are possible to maximize the filter medium inclusion, but the oval shape is preferred.

The filters pan 18a has at least one alignment opening 26a configured to align the cartridge 14a when it is installed in the housing 12a. The embodiment shown has alignment openings 26a on two sides of the filter pan 18a. This allows the cartridge to be installed in either direction within the housing 12a. It is possible to have a cartridge 14a that has an alignment opening 26a along each side of the filter pan 18a which would allow the cartridge 14a to be loaded onto the housing 12a in any orientation. In such embodiments, it is likely that the filter pan 18a is sized to have the same length along each side.

Figure 3:
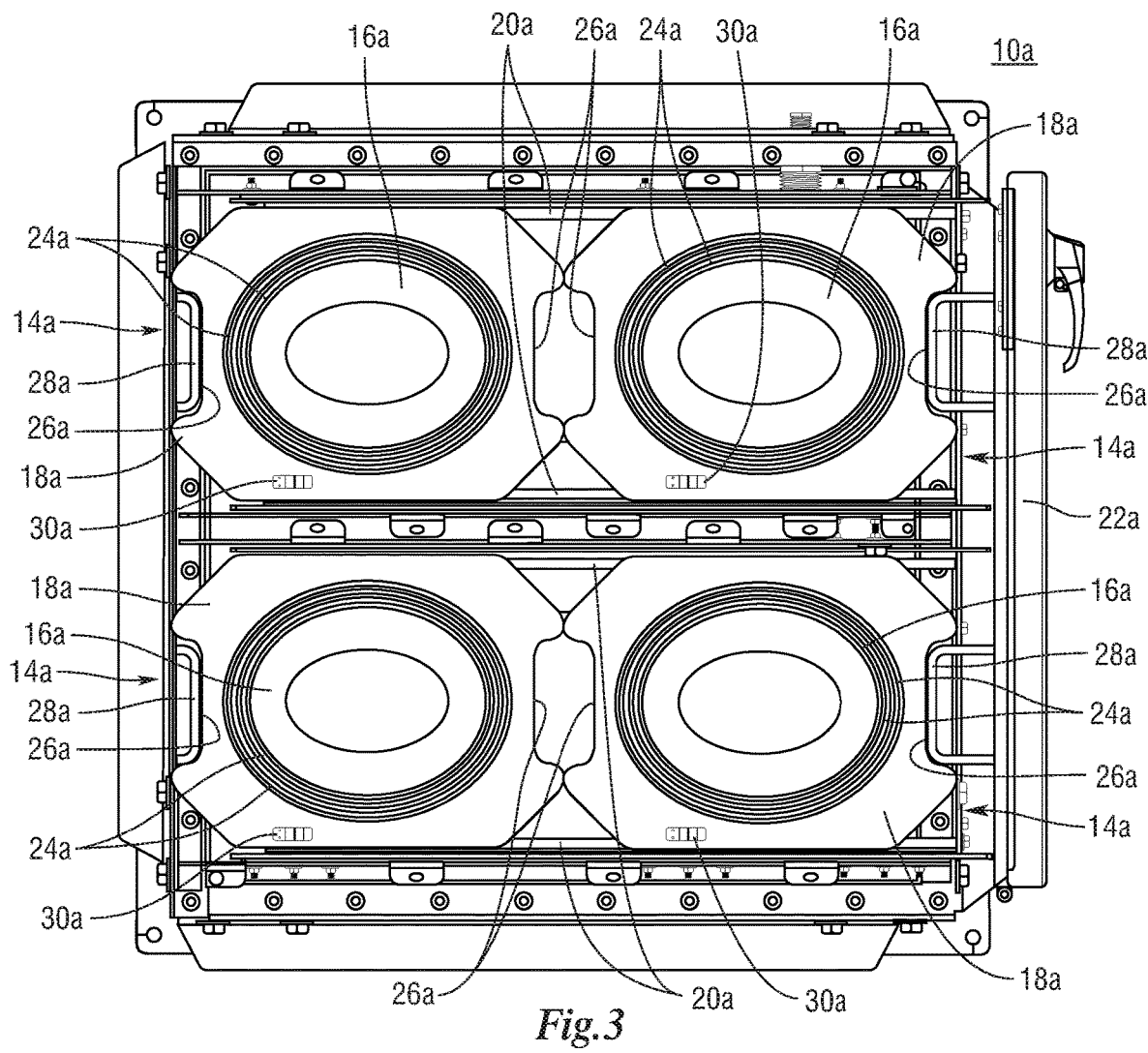
FIG. 3 is a top view of an embodiment of a dust collector system.

Referring to FIG. 3, the housing 12a incorporates a series of alignment blocks 28a sized and shaped to correspond to the alignment openings 26a of the filter pan 18a. In the embodiment shown, the housing incorporates two alignment blocks 28a at either end of each pair of rails 20a. These alignment blocks 28a are positioned such that when the cartridges 14a are installed in the housing 12a, the alignment opening 26a of the filter pan 14a aligns with the alignment block 28a of the housing 12a. Further, the alignment blocks 18a are configured such that improper installation of the cartridges 14a into the housing 12a prevents the door 22a from closing which would prevent the operation of the vertically oriented dust collector 10a. This ensures that a user must install the cartridges 14a properly for the system to operate. The number of alignment blocks 28a may be varied so long as at least one exists to correspond to an alignment opening 26a in a cartridge 14a. Two alignment blocks 28a per pair of rails 20a allows for better alignment of the cartridges 14a within the housing.

The filter pans 18a are also shown to have mitered corners. This makes them easier to slide in and out of the dust collector 10a and may also be incorporated to fit around structural elements in the housing 10a. This also allows the filter pan 18a to be made using less material than if it were squared off.

The cartridges 14a may also incorporate a grounding clip 30a that is, as the name implies, wired to ground. This helps eliminate the buildup of static electricity in the cartridges 14a that would encourage the settling of dust and particulate matter to the cartridges 14a.

Figure 5:
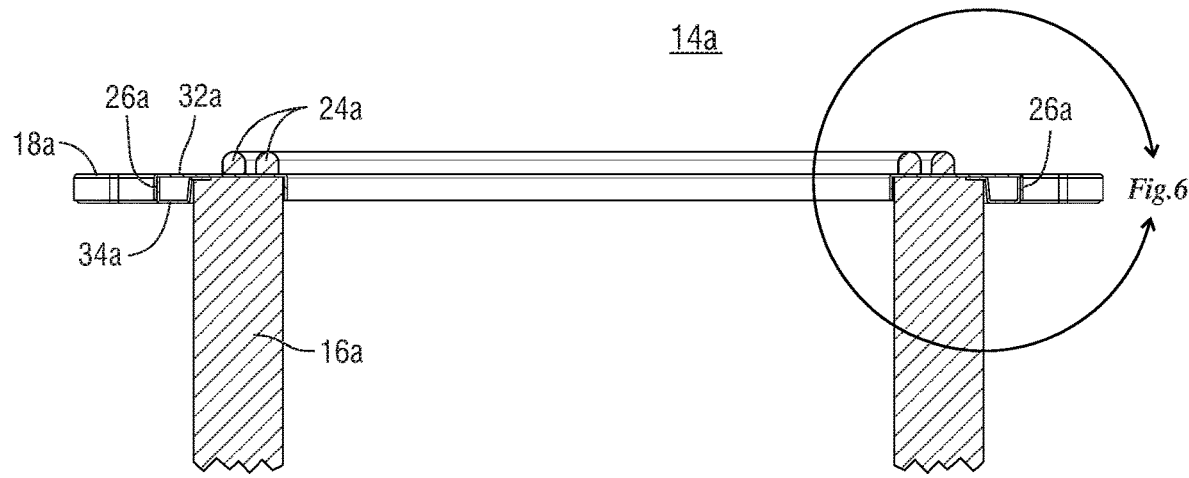
FIG. 5 is a cross section of the cartridge of FIG. 4.
Figure 6:
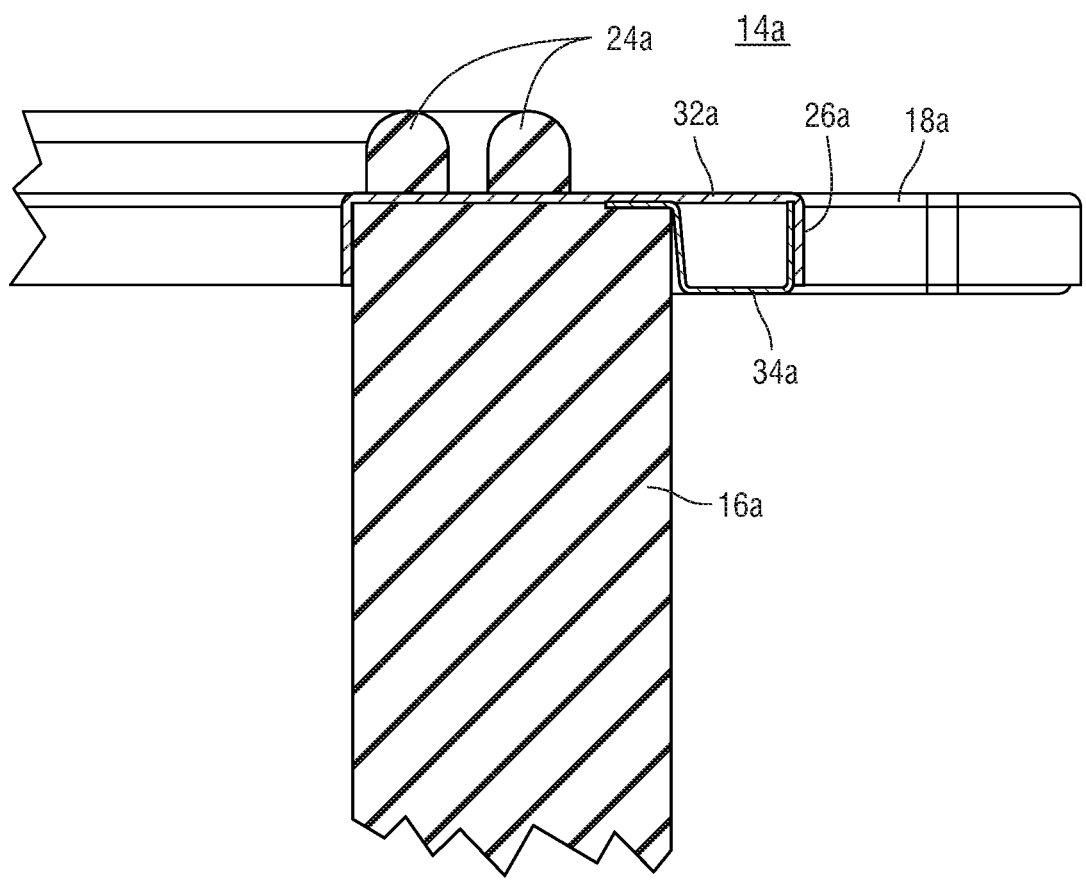
FIG. 6 is a close up of the cross section of the cartridge of FIG. 5.

As best seen in FIGS. 5 and 6, the filter pan 18a comprises a double walled pan with a top pan 32a and a bottom pan 34a. The filter 16a is mounted to the filter pan 18a with potting compound that acts as a glue to affix the filter 16a to the filter pan 18a and a sealant to prevent the passage of air at the mounting points. Potting compound may also be used to seal the top pan 32a and the bottom pan 34a.

Figure 7:
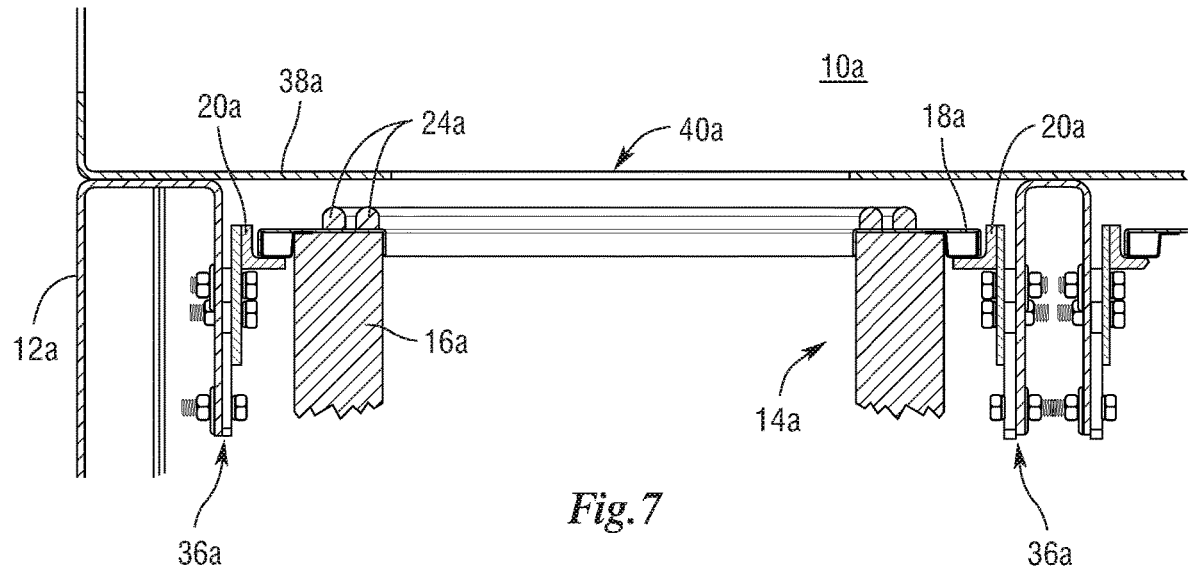
FIG. 7 is a cross section view of a cartridge in a housing with the rails in the lower position for installation of cartridges.
Figure 8:
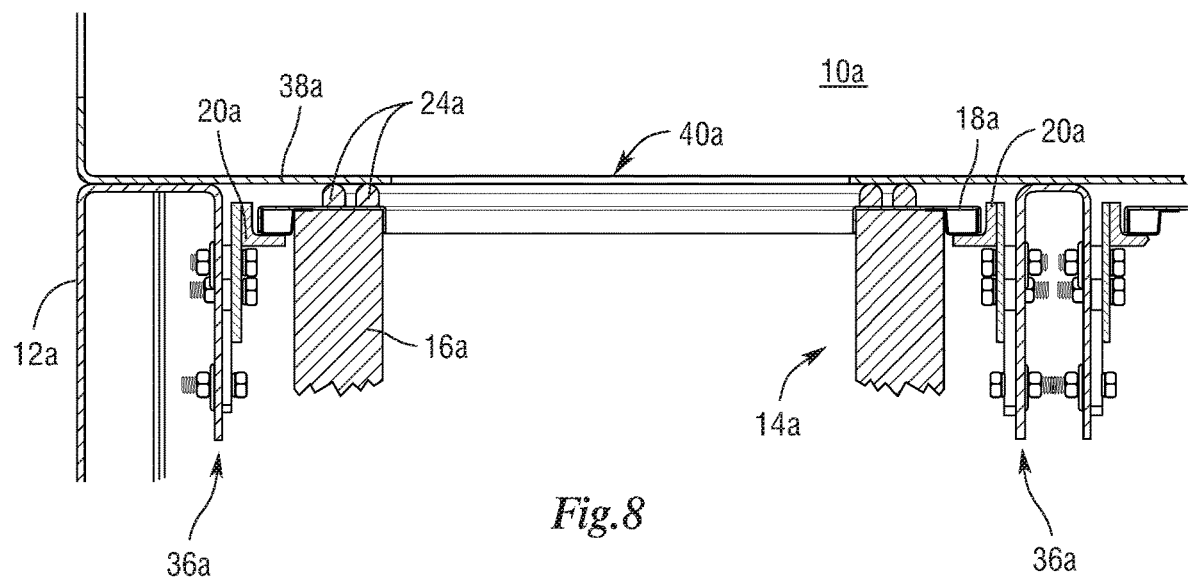
FIG. 8 is a cross section view of the cartridge in a housing of FIG. 7 with the rails in the upper position in which the cartridge is secured in the dust collector system.

As best understood by comparing FIGS. 3, 7, and 8, it can be shown how cartridges 14a mounted to the rails 20a of the housing 20a and installed within the dust collectors 10a. Each pair of rails 20a is mounted to a lever system 36a. When a user opens the door 22a, the user gains access to the lever system to lower the rails 20a to the position shown in FIG. 7. The cartridges 14a are located within the dust collector 10a housing 12a under an upper plate 38a which has a series of openings 40a that correspond to where the cartridges 14a must be located within the housing 12a. With the rails 20a in the lower position, the user may remove and replace cartridges 14a as needed. New cartridges 14a are pushed back into place such that their alignment openings 26a align with the alignment blocks 28a of the housing 12a. The rails 20a are then raised as shown in FIG. 8 to push the gaskets 24a against upper plate 38a and form an airtight seal between the cartridge 14a and the upper plate 38a. If the cartridges 14a are misaligned for any reason, they will bump up against the alignment blocks 28a. This would prevent the rail 20a from sealing the cartridges 14a in place within the housing 12a and would prevent the operation of the vertically oriented dust collector.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed is:

1. A vertically oriented dust collector configured to filter dry particulate matter from an air stream comprising:
   a housing containing at least one cartridge;
   each said cartridge comprising:
      a filter pan having an opening;
      a filter incorporated into said opening; and
      said filter pan having at least one alignment opening;
   said housing further comprising:
      at least one pair of rails oriented parallel to each other within said housing onto which each said cartridge is mounted;
      said rails displaceable between a lower position for inserting and removing cartridges and an upper position for securing cartridges within the dust collector;
      at least one alignment block sized and shaped to correspond to said alignment opening of said filter pan; and
      said cartridge inserted onto said rails such that said alignment opening engages with said alignment block.

2. The vertically oriented dust collector of claim 1 further comprising said opening is elliptical and said filter has an elliptical cross-section.

3. The vertically oriented dust collector of claim 1 further comprising said opening is circular and said filter has a circular cross-section.

4. The vertically oriented dust collector of claim 1 further comprising said housing contains four said cartridges.

5. The vertically oriented dust collector of claim 1 further comprising said housing contains two pairs of said rails.

6. The vertically oriented dust collector of claim 1 further comprising said housing contains two said alignment blocks for each pair of said rails.

7. The vertically oriented dust collector of claim 1 further comprising said filter pan has mitered corners.

8. The vertically oriented dust collector of claim 1 further comprising, said alignment block is configured such that improper installation of said cartridges into said housing prevents the operation of the vertically oriented dust collector.

9. The vertically oriented dust collector of claim 1 wherein said filter pan is a double walled pan that comprises a top pan and a bottom pan.

10. The vertically oriented dust collector of claim 1 each said cartridge further comprises a grounding clip.

* * * * *